Figure 1:
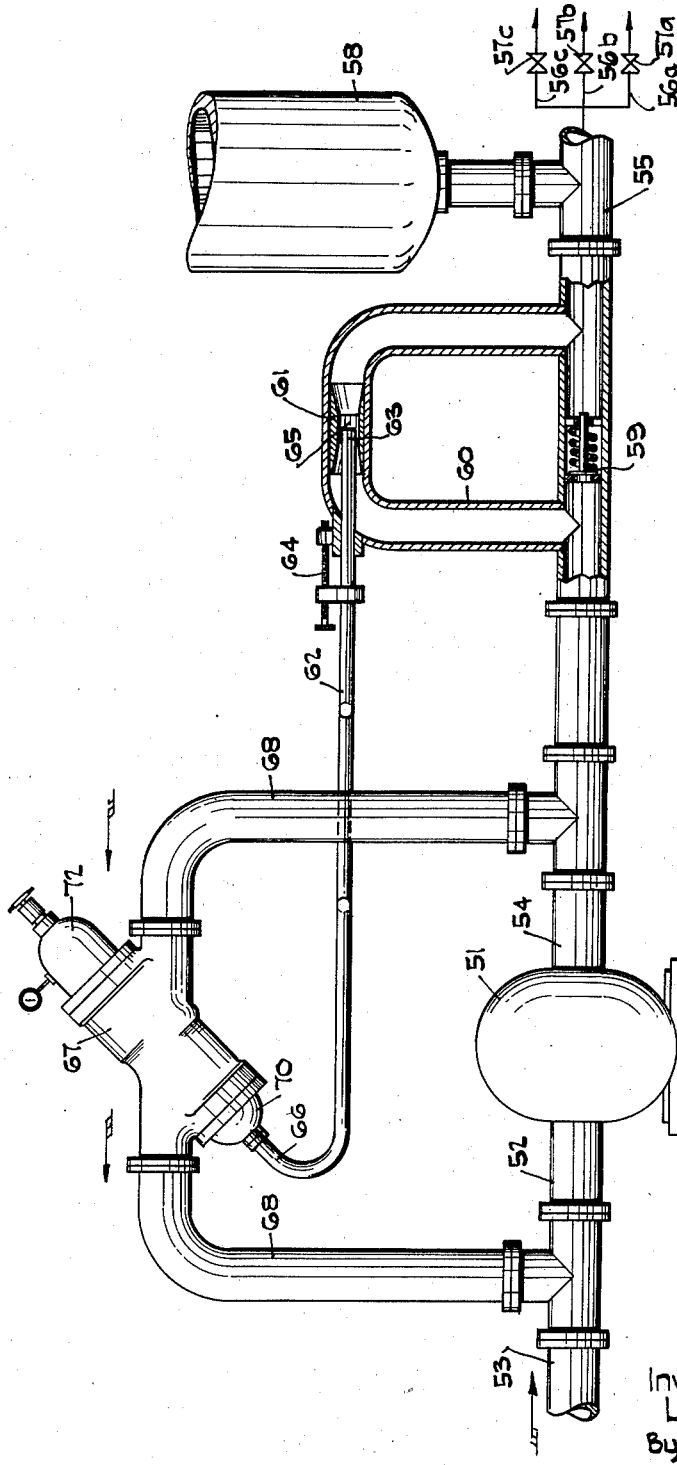

Н

United States Patent Office 2,829,664
Patented Apr. 8, 1958

2,829,664

FLUID FLOW CONTROL VALVE WITH REMOTE PRESSURE CONTROL

Lawrence Almeric Mountford, London, England, assignor to Shell Development Company, Emeryville, Calif., a corporation of Delaware Application March 10, 1953, Serial No. 341,406

Claims priority, application Great Britain September 4, 1952

2 Claims. (Cl. 137—108)

This invention relates to valves for controlling the rate of flow of fluids in bulk in accordance with variable control pressure distinct from pressures occurring within the valve structure, e. g., the pressure of the fluid at its delivery point, which pressure is hereinafter called the "delivery pressure." The valve is particularly, although not exclusively, applicable in equipment for fuelling aircraft, where it is required to deliver the fuel at a high rate, e. g., several hundred gallons per minute, while insuring that the delivery pressure does not exceed the value at which the fuel can safely be forced into the tanks in spite of variations which are liable to occur in the pumping pressure and/or the resistance to flow offered by such equipment as filters, air separators, meters and the like, and variations in the speed with which air can leave the tank.

Devices for avoiding unduly high pressures in the tank, such as might cause rupture thereof, by shutting off or throttling a control valve are known, but the known types of valve all introduce too great a flow resistance to be tolerated when high flow velocities are involved.

It is an object of the invention to improve the operation of such valves and to provide an improved valve that is capable of efficiently controlling the flow of a fluid which is to be delivered in large quantities at high velocities in accordance with a control pressure, e. g., a delivery pressure, which must be kept within a small range of values in spite of variations in the pressure head available for pumping the fluid through the valve or in the resistance offered to its flow. Ancillary thereto, it is an object to provide a control valve of the type indicated that will operate effectively and offer only a relatively small resistance to the flow of fluid despite flow at high velocities.

A further object is to provide a flow control valve having mechanism for operating it automatically in response to a control pressure at a remote point, e. g., the controlled delivery pressure, including pressure-responsive elements with movable walls both upstream and downstream from the movable valve for balancing static thrusts on either side thereof, wherein the valve is mounted for movement in a direction that has a component parallel to the direction of flow of the fluid in the sense that an opening movement of the valve is in a direction opposite to the fluid flow, so that the valve is assisted in the closing movement by the hydrodynamic thrust of the flowing fluid, but may be readily opened in view of the absence of hydrostatic thrust when the valve is shut. Ancillary thereto, it is an object to provide a valve of the type immediately above indicated that offers a relatively low flow resistance to the fluid and avoids the need for a double bend in the conduit or casing.

In summary, the valve for controlling the rate of flow of fluids according to the invention comprises a valve casing with an inlet and an outlet, having a valve seat that faces upstream and divides the casing into upstream and downstream chambers; a reciprocable valve member adapted to coact with the valve seat movable at least partly in a direction perpendicular to the plane of the valve seat, the valve member having an upstream stem extending from its upstream face and a downstream stem extending from its downstream face; a first pressure-responsive movable wall, such as a flexible or deformable diaphragm, bellows, piston, plunger or the like, connected through the upstream stem for movement in accordance with the movement of the valve member and having a face thereof exposed to the upstream pressure of the fluid (e. g., the pressure in said upstream chamber) tending to open the valve, the effective area of said face being such as to balance the static fluid force acting on the upstream face of the valve member; a second pressure-responsive movable wall connected through the downstream stem for movement in accordance with the movement of the valve member having a face thereof exposed to the downstream pressure of the fluid (e. g., the pressure in said downstream chamber) tending to close the valve, the effective area of said face being such as to balance the static fluid force acting on the downstream face of the valve member; pressure-responsive means for urging the valve member to one position thereof, e. g., to closed position, in accordance with a variable control pressure, e. g., the delivery pressure, as transmitted by a control fluid, such as a pressure chamber having an inlet for connection to a conduit through which the control fluid from a remote point can be admitted for acting directly or indirectly on the opposite face of one of said movable walls, e. g., the first wall; and means for applying a regulating or bias thrust to the valve member tending to move the latter to the opposite position thereof, e. g., to open position, such as a pressure chamber containing a gas which acts directly or indirectly on the opposite face of the other of said movable walls, e. g., the second wall, or a spring. The control pressure and the bias pressure or force can, of course, also be connected so that the former tends to open the valve member and the latter biases the valve member toward closed position. Although the invention is not limited thereto, it is preferred to fix the movable walls to the corresponding valve stems for movement therewith, without interposing any differential displacement element; in such case and where the movable walls are of a kind which offer no appreciable resistance of their own to movement, the effective area of the exposed face of the first movable wall is made substantially equal to the effective area of the upstream face of the valve member, while the effective area of the exposed face of the second movable wall is made substantially equal to the effective area of the downstream face of the valve member. In the most convenient construction, wherein the valve member has upstream and downstream stems of equal diameters, resulting in equal effective upstream and downstream areas for the valve member, these areas and the effective areas of the exposed faces of both movable walls are all equal.

In the preferred arrangement the inlet and outlet are in the form of pipes that are disposed coaxially or substantially so, whereby the casing can be readily coupled into a pipe or between two sections of flexible hose. Further, it is preferred to incline the plane of the valve seat so that neither the said plane nor the perpendicular thereto is parallel to the direction of flow of fluid (i. e., to the common axis of the inlet and outlet pipes, in the preferred arrangement).

By providing, as stated above, that the effective areas of the valve member and of the pressure-responsive movable walls are in pressure-balancing relation, e. g., all substantially equal, the resultant static thrust of the fluid on the valve member is substantially zero, with the result that a small drop in delivery pressure is sufficient to open the valve and that rapid opening is obtained, for example, when commencing delivery. On the other hand, the fact that the plane of the valve seat is at a substantial angle to the direction of flow of the fluid insures that when the valve is open and fluid is flowing through the casing, the upstream face of the valve member is subjected to a greater hydrodynamic thrust than the downstream face, so that the closing movement of the valve under the influence of an excessive delivery pressure is accelerated, thereby rapidly cutting down the delivery pressure to a safe value. This effect is at a maximum if the plane of the valve seat is at right angles to the flow (i. e., when the axis of movement of the valve member is parallel to the flow), but for constructional reasons such an arrangement usually necessitates introducing a double bend into the pipe in order to achieve a satisfactory disposition of the valve stems and the pressure-responsive movable walls, and this introduces resistance to fluid flow. In the preferred arrangement the plane of the valve seat is at an acute angle, for example an angle between 30° and 60°, to the direction of fluid flow between the inlet and outlet of the casing, thereby allowing the valve stems and the attached diaphragms, pistons or plungers constituting the movable wall to be accommodated at the sides of the pipe, thus obviating the necessity for a bend in the casing.

This application is a continuation-in-part of my parent application Serial No. 341,406, filed Jan. 23, 1951, which has matured into Patent No. 2,788,192.

Figure 2:
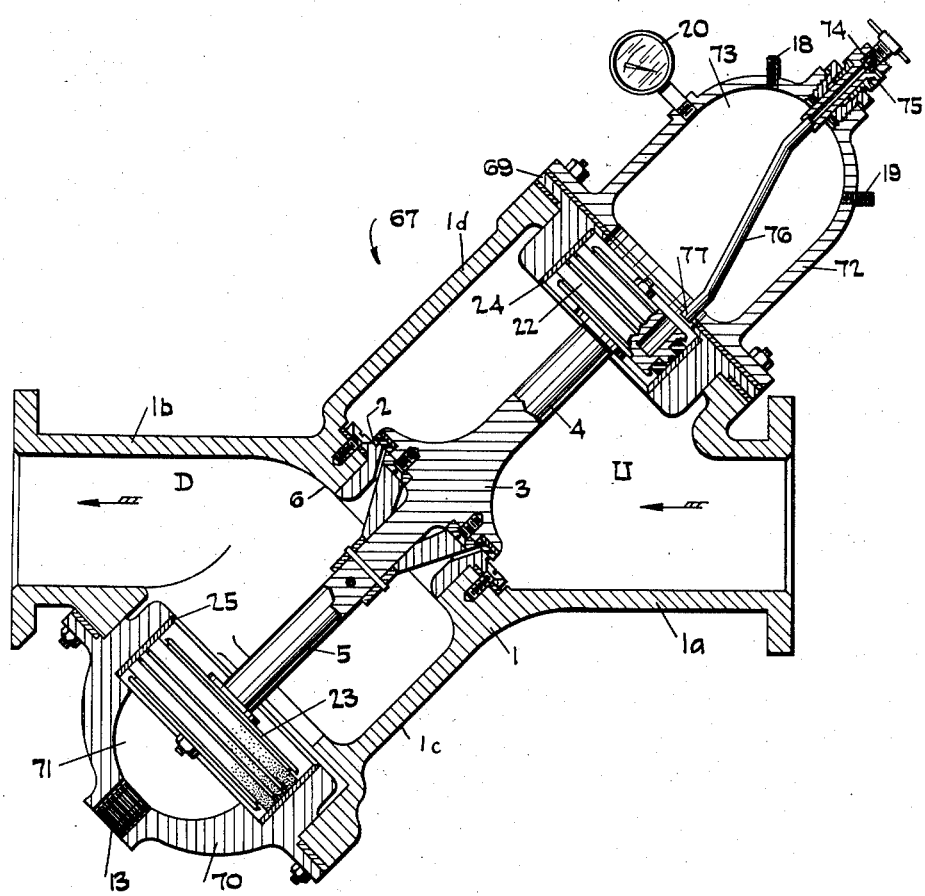

The invention will be further described by reference to the drawings forming a part of this specification:

Figure 1 is a diagrammatic view showing the application of a valve in a by-pass line of a liquid dispensing system; and Figure 2 is a longitudinal section view through the valve used in Figure 1.

Figures 1 and 2 show the application of the valve in a by-pass line of a fuel dispensing system and illustrate the valve itself whereby the control pressure is effective to open the valve and the regulating thrust acts as a valve closing bias. This valve is useful in circumstances in which it is required that the valve should open when the control pressure, e. g., the delivery pressure, rises to a predetermined value, and the system indicated in Figure 1 is merely illustrative of such an application. In this system the pressure of the liquid in a delivery line acts as control pressure for opening the valve to relieve excess pressures arising from changes in delivery, such as are caused for example by the opening and closing of one or more dispensing valves downstream from a pump.

Figure 1 shows an example of a so-called static fueling system used at airports for fueling aircraft. In such a system liquid fuel is fed by a positive displacement pump from an adjacent static bulk storage tank into a pipe line system feeding one or more valve-controlled dispensing points located adjacent the parking positions of the aircraft, i. e., some distance from the pump. In the present example the modified valve of the invention is used to control the flow of liquid through the by-pass line of the pump, the valve functioning in accordance with the pressure existing in the pipe line downstream of the pump so as to open when the delivery line is shut down, permitting the pump to be kept in operation against a negligible head during periods of delivery line shut-down.

The complete system comprises a pump 51 driven, for example, by a diesel engine (not shown), which may be kept in continuous operation and may be provided with a governor. The pump is connected on the suction side 52 by way of a pipe 53 to a bulk storage tank and on the discharge side 54 through a delivery line 55 to a dispensing system comprising a number of pipes 56a–56c, each leading to a dispensing point controlled by a corresponding delivery valve 57a–57c. The delivery line 55 may, if desired, communicate with a pressure storage vessel or reservoir 58 of any suitable type, such as one containing a compressed gas in direct contact with the liquid or isolated therefrom by a diaphragm, a gas bag, etc., as are well known in the art. This vessel smooths out minor pressure fluctuations in the pipe 55 and prevents rapidly recurring operations of the valve in the pump by-pass line, described below; us of this vessel is, of course, optional.

A spring-loaded valve 59 is interposed between the discharge side 54 and the delivery line 55, the spring being arranged to urge the valve to closed position and the valve being subjected to the upstream and downstream liquid pressures so as to be opened upon a relative rise in the upstream pressure. A branch line 60 including a venturi constriction 61 is connected as a by-pass to the valve 59. The purpose of the valve 59 is to insure that liquid flow in the delivery line 55 is always accompanied by liquid flow through the venturi constriction 61, the valve 59 remaining open whenever appreciable flow through the delivery line 55 is taking place but tending to close as the rate of flow decreases as a result of partial or complete shut-down of the valves 57a–57c. A bleed line 62 of small bore has one end 63 thereof terminating within the venturi constriction. This end is advantageously axially adjustable, e. g., by making the line 62 of flexible tubing, and providing a screw 64 in threaded engagement with a collar carrier by the line 62 and rotatably secured against axial movement with respect to the venturi constriction. Thereby the position of the end 63 of the bleed line can be varied with respect to the eye 65 of the constriction. The bleed line is connected at its other end 66 to a valve 67 constructed in accordance with the invention to transmit a control pressure thereto. This valve is connected in a by-pass line 68 connecting the suction side 52 and the discharge side 54 of the pump 51.

The valve is shown in more detail in Figure 2. It comprises a casing 1 having an inlet 1a and an outlet 1b coaxial therewith and an internal flange 6 dividing the casing into upstream and downstream chambers U and D. A valve seat 2 is mounted on the upstream face of the flange by screws to cooperate with a circular valve member 3 in the chamber U. The valve and seat are situated in a plane which is 45° to the direction of flow, although the plane may be otherwise disposed, or even substantially normally to the direction of flow. The valve member has two stems, an upstream stem 4 and a downstream stem 5. The extremities of these stems are fixed to pistons 22 and 23, respectively, which are slidable within cylinders 24 and 25, respectively, and form liquid-tight seals therewith. These cylinders are bushings secured within a supporting block 69 and an end closure 70, respectively, bolted to flanges on the casing 1. The effective areas of the valve member 3 and the pistons 22 and 23 are all substantially equal so that the resultant static thrust on the valve member 3 is substantially zero.

The closure member 70 forms a chamber 71 separated from the interior of the valve casing by the piston 23. In fluid-tight engagement with the block 69 and bolted to the casing is a hollow bell-shaped casing 72 extending outwardly and forming, together with the part of the block beyond the piston 22, and air chamber 73.

The closure member 70 is provided with a connection 13 to which the end 66 of the bleed line 62 is connected, and the hollow casing 72 carries two spring seated pneumatic valves 18 and 19 and a pressure gauge 20 for admitting air and adjusting the regulating pressure until a predetermined reference pressure is attained. The air acts on the piston 22 and in this case provides a valve closing bias to regulate the operating pressure of the valve. The hollow casing is also provided with a needle valve 74 which can be screwed towards and away from a conical seat 75 located at the upper end of a pipe 76 whose lower end 77 is disposed adjacent the inner end of the member 72, on the lower side thereof. The purpose of the valve 74 is to enable any liquid which collects in the lower part of the chamber 73 as the result of leakage past the piston 22 to be discharged by air pressure through the pipe 76.

The system of Figures 1 and 2 operates as follows: when the pump 51 is in operation and one or more of the valves 57a–57c are open, liquid flow through the venturi constriction 61 occurs and is accompanied by an appreciable reduction in the control pressure of the liquid in the bleed line 62 and hence of that in the chamber 71 of the valve 67. The actual difference between the control pressure in the bleed line and the discharge pressure of the pump 51 depends upon the characteristics of the venturi constriction and upon the position of the end 63 of the bleed line in relation to the eye 65. If now the regulating or reference pressure exerted by the air in the chamber 73 is greater than the control pressure of the liquid in the chamber 71 during flow through the venturi constriction, there is a resultant pressure which holds the valve member 3 tightly against the seat 2 so that the by-pass line 68 remains closed. Since in normal operation the control pressure is appreciably less than the pump discharge pressure, the regulating pressure in the chamber 73 required to maintain the valve 67 shut during normal operation of the system is also appreciably less than the normal discharge pressure of the pump 51.

If the rate of liquid flow to the dispensing points decreases as a result of the closing of one or more of the delivery valves 57a–57c, the rate of liquid flow through the venturi constriction 61 is still maintained due to the action of the spring-loaded valve 59. However, as soon as liquid flow through the delivery line 55 and, hence, through the venturi constriction, ceases as a result of a complete shut-down of the dispensing points the liquid pressure in the bleed line 62 rises and there is a corresponding increase in the control pressure acting on the piston 23. As soon as the control pressure rises sufficiently to overcome the regulating pressure in the chamber 73, the valve member 3 moves away from the seat 2, thereby opening the valve 67 to provide an alternative outlet through the by-pass 68 for the liquid discharged by the pump. Since the control pressure required to open the valve 67 and keep it open is appreciably less than normal pump discharge pressure, the pressure at the discharge 52 during by-pass operation is appreciably lower than when operating under normal delivery conditions so that expenditure of energy by the prime mover that drives the pump 51 is minimized during such idling periods.

The use of a venturi constriction enables the use of a lower regulating pressure in the chamber 73 than would be necessary if the bleed line were connected directly to a point in the delivery line 55. In the system illustrated, for example, the regulating pressure can be as low as between 8 and 10 lbs. per sq. in., the actual value being dependent upon the characteristics of the constriction. An advantage of this is that there is only a small load on the pump when the latter is started against a closed delivery line. With known by-pass systems, the starting load is usually high due to the high pressure at which the by-pass valves open and usually an auxiliary manual control is needed in order to reduce the starting load. Such an auxiliary control is unnecessary in the system described above. The valve according to the invention may, of course, also be employed in conventional systems by connecting the bleed line 62 directly to the delivery line 55.

When liquid flow through the venturi constriction 61 recommences due to liquid take-off from one or more of the dispensing points, the control pressure decreases and the resulting fall permits the valve member 3 to close on the seat 2. As soon as the by-pass line 68 is shut by closing of the valve 67, the pump discharge pressure rises to its normal value and normal operation of the system recommences.

Aside from adjusting the regulating pressure in the chamber 73, the position of the end 63 of the bleed line is adjusted by the screw 64 to obtain the desired changes in the control pressure.

I claim as my invention:

1. In a fluid flow control valve having a chambered valve housing containing a valve seat, a valve member cooperable therewith and an end plate providing an opening in the housing in the form of a cylinder above said valve seat, the combination of operating means for said valve member including a piston above said valve member fitted to close said opening so that the piston is exposed to fluid within the housing and is connected to said valve member for movement therewith, an enclosed wall defining a gas pressure chamber distinct from said housing and constituted in part by the top of said piston in the wall of said pressure chamber, a valve for admitting a gas at a pressure to act on said piston, a second valve opening in the remote wall of said chamber above said piston and an internal pipe connected thereto and terminating in the proximity of said cylinder adapted to remove liquid leaking past said piston from the interior of said valve housing.

2. In a fluid flow control apparatus the combination of a main fluid delivery line, a pump in said line, a fluid bypass line connected to said main line on opposite sides of said pump, a chambered valve casing in said bypass line, a valve seat within said casing dividing the casing into upstream and downstream chambers, said chambers providing passageways for the flow of fluid, a pair of opposed openings in said casing situated one on each side of said valve seat, said openings having cylindrical walls of cross-sectional areas substantially equal to that of said valve seat, a valve member within one of said chambers cooperating with said valve seat to control the flow of fluid, a piston reciprocable within each of said cylindrical walls of said openings each piston having an inner face exposed to the fluid within the respective chambers and connected to said valve member for movement therewith, an enclosed wall at each of said openings, each said wall defining a pressure chamber separate from said chambers of the casing and bounded in part by the outer face of one of said pistons the chamber on the upstream side of the valve casing containing a fluid under pressure to maintain a bias urging the valve member into closed position on said valve seat, a conduit leading from the pressure chamber on the downstream side of the valve casing, a back pressure valve in said main fluid delivery line, a second bypass line connected to said fluid delivery line on opposite sides of said back pressure valve, a venturi in said second bypass line, said conduit from said pressure chamber on the downstream side of the valve casing terminating at said venturi whereby said valve member is maintained on said valve seat upon normal flow of liquid through said venturi and said main fluid delivery line.

References Cited in the file of this patent

UNITED STATES PATENTS

| Number | Name | Date |
|---|---|---|
| 20,314 | Adams | May 25, 1858 |
| 208,344 | Stephens | Sept. 24, 1878 |
| 313,750 | Merrill | Mar. 10, 1885 |
| 915,204 | Montgomery | Mar. 16, 1909 |
| 1,178,528 | Loepsinger | Apr. 11, 1916 |
| 1,986,429 | Dunham | Jan. 1, 1935 |
| 2,082,325 | Cross | June 1, 1937 |
| 2,098,696 | Sparrow | Nov. 9, 1937 |
| 2,335,067 | Langley | Nov. 23, 1943 |
| 2,365,650 | Shaw | Dec. 19, 1944 |
| 2,602,627 | Britton | July 8, 1952 |

FOREIGN PATENTS

| Number | Country | Date |
|---|---|---|
| 339,086 | France | 1904 |
| 113,581 | Great Britain | 1918 |